(12) United States Patent
Sarangi

(10) Patent No.: US 11,332,024 B2
(45) Date of Patent: May 17, 2022

(54) PROXIMITY DETECTION ARRANGEMENT AND METHOD

(71) Applicant: VOLVO CAR CORPORATION, Gothenburg (SE)

(72) Inventor: Tapas Anjan Sarangi, Hisings Karra (SE)

(73) Assignee: VOLVO CAR CORPORATION, Gothenburg (SE)

( * ) Notice: Subject to any disclaimer, the term of this patent is extended or adjusted under 35 U.S.C. 154(b) by 417 days.

(21) Appl. No.: 15/969,040

(22) Filed: May 2, 2018

(65) Prior Publication Data

US 2018/0326856 A1    Nov. 15, 2018

(30) Foreign Application Priority Data

May 9, 2017   (EP) .................................... 17170207

(51) Int. Cl.
| | |
|---|---|
| *B60L 53/00* | (2019.01) |
| *B60L 1/00* | (2006.01) |
| *B60L 3/00* | (2019.01) |
| *B60L 53/14* | (2019.01) |
| *B60L 53/16* | (2019.01) |
| *H02J 7/00* | (2006.01) |

(52) U.S. Cl.
CPC .............. *B60L 53/00* (2019.02); *B60L 1/003* (2013.01); *B60L 3/0046* (2013.01); *B60L 3/0069* (2013.01); *B60L 53/14* (2019.02); *B60L 53/16* (2019.02); *H02J 7/00* (2013.01)

(58) Field of Classification Search
CPC ....................................................... B60L 53/16
See application file for complete search history.

(56) References Cited

U.S. PATENT DOCUMENTS

| | | | |
|---|---|---|---|
| 2010/0079105 A1 | 4/2010 | Iwanaga et al. | |
| 2012/0032634 A1 | 2/2012 | Cavanaugh | |
| 2012/0048983 A1* | 3/2012 | Bianco ................ | B60L 11/1818 |
| | | | 242/388.9 |

(Continued)

FOREIGN PATENT DOCUMENTS

| | | |
|---|---|---|
| CN | 103107512 A | 5/2013 |
| CN | 205160141 U | 4/2016 |

(Continued)

OTHER PUBLICATIONS

Masuda, JP2011010420 Translation, Charging System of Electric Vehicle and Charge Control Device of Electric Vehicle (Year: 2011).*

(Continued)

*Primary Examiner* — Drew A Dunn
*Assistant Examiner* — Tynese V McDaniel
(74) *Attorney, Agent, or Firm* — Brooks Kushman P.C.

(57) ABSTRACT

A circuit arrangement for a vehicle charger system, configured to reduce drain current in a connector proximity detection circuit when a charge connector is inserted in a charge socket and a charge cycle is terminated. The circuit arrangement includes a resistor and a switch connected in parallel and arranged in the proximity detection circuit. The switch is configured to be opened when a charge cycle has started, and the switch is adapted to remain open when the charge cycle has terminated and the charge connector remains in the charge socket.

15 Claims, 2 Drawing Sheets

(56) References Cited

U.S. PATENT DOCUMENTS

| | | | | |
|---|---|---|---|---|
| 2012/0286729 | A1* | 11/2012 | Yegin | B60L 3/04 |
| | | | | 320/109 |
| 2013/0069589 | A1* | 3/2013 | Kai | H02J 7/0042 |
| | | | | 320/109 |
| 2013/0099739 | A1* | 4/2013 | Takashima | B60L 53/14 |
| | | | | 320/109 |
| 2013/0190968 | A1* | 7/2013 | Nitzberg | G07C 3/00 |
| | | | | 701/31.6 |
| 2014/0042966 | A1* | 2/2014 | Masuda | B60L 58/40 |
| | | | | 320/109 |
| 2014/0210449 | A1* | 7/2014 | Ichikawa | B60L 50/40 |
| | | | | 324/76.11 |
| 2014/0232182 | A1* | 8/2014 | Kinomura | B60L 53/16 |
| | | | | 307/10.1 |
| 2015/0097526 | A1* | 4/2015 | DeDona | B60L 3/00 |
| | | | | 320/109 |
| 2016/0159231 | A1* | 6/2016 | Jefferies | B60L 53/68 |
| | | | | 320/109 |
| 2016/0297313 | A1* | 10/2016 | Ono | B60L 55/00 |

FOREIGN PATENT DOCUMENTS

| | | | |
|---|---|---|---|
| CN | 105882422 A | | 8/2016 |
| CN | 106157396 A | | 11/2016 |
| CN | 206106967 U | | 4/2017 |
| DE | 102016116929 A1 | | 3/2017 |
| JP | 2011010420 A | * | 1/2011 |
| JP | 5229184 B2 | * | 7/2013 |

OTHER PUBLICATIONS

Yoshitoku JP52291842 translation, (Year: 2013).*
Danyk Anonymous, Delay Switch and Inrush Current Limiter, Apr. 29, 2015, XP055421766, retrieved from the Internet <<http://danyk.cz/st_sp_en.html>>.
European Patent Office, Extended European Search Report for corresponding Application No. EP17170207.9, dated Nov. 17, 2017, 10 pages.
China Patent Office Office Action for corresponding Application 201810409510.2 dated Jan. 20, 2021, 7 pages.
Yilmaz et al., "Review of Battery Charger Topologies, Charging Power Levels, and Infrastructure for Plug-In Electric and Hybrid Vehicles," IEEE Transactions on Power Electronics, vol. 28, No. 5, May 2013, pp. 2151-2169.

* cited by examiner

PROXIMITY DETECTION ARRANGEMENT AND METHOD

CROSS-REFERENCE TO RELATED APPLICATIONS

This application claims foreign priority benefits under 35 U.S.C. § 119(a)-(d) to European patent application number EP 17170207.9, filed May 9, 2017, which is incorporated by reference in its entirety.

TECHNICAL FIELD

The present disclosure relates to a circuit arrangement for a vehicle charger system adapted to reduce drain current in a proximity detection circuit when a charge connector is inserted in a charge socket and a charge cycle is terminated.

BACKGROUND

Electric vehicles generally relate to vehicles that have batteries or battery units that store energy, where the batteries are designed to provide electrical power for propelling and accelerating the vehicle and also for providing power to electrical systems used in the vehicle. The stored energy is consumed when the electric vehicle is used and the battery needs to be re-charged in order to replenish the level of stored energy through a connection to an external electric power supply.

Hybrid electric vehicles are using a combination of an internal combustion engine system and an electric propulsion system. The internal combustion engine can be operated intermittently to provide power to the hybrid electric vehicle's driveline when needed depending on the driving conditions. In low speed driving situations the vehicle may be operated by only using the electric propulsion system and when more power is needed the internal combustion engine supplies additional power to the driveline, for example when driving at higher speeds. Also hybrid electric vehicles have batteries or battery units that store energy, where the batteries are used for providing electrical power for propelling and accelerating the vehicle and for systems used in the vehicle. A plug-in hybrid electric vehicle uses a system with re-chargeable batteries that can be restored into a full charge condition through a connection to an external electric power supply.

When re-charging batteries in electric vehicles or hybrid electric vehicles, an on-board charging system is generally used. The on-board charger is connected to an external power source which provides e.g. a direct current (DC) suitable for re-charging the batteries. The on-board charger is normally connected to the power source via a charging cable having a charge connector that is designed to match a corresponding charge socket arranged in the vehicle.

In order to be able to start a charge cycle, several control signals are sent between the charger and the vehicle. The correct connection of the charge connector to the charge socket is controlled. It is further controlled that the ground connection is correct, and that the vehicle is prepared for charging. When all controls are correct, the charge cycle can start by sending one or more charge sequence signals from the charger to the vehicle. By receiving the charge sequence signals, the vehicle will connect the power lines from the power source to the batteries by closing switches in the power lines. One example of a charging method for vehicles using direct current is CHAdeMO.

In order to prevent a charge cycle from starting when the ground connection is broken, the CHAdeMO system is provided with a false-drive preventing circuit, which will detect a disconnected ground connection and which will prevent a charge cycle to start if the ground connection is broken.

The false-drive preventing circuit is comprised in the connector proximity detection circuit. The connector proximity detection circuit is used to detect that the charge connector is correctly inserted in the charge socket. To do this, there is provided a 10 mA detection current flow which is detected by using an opto-coupler. The detection current flow flows when the charge connector is connected to the charge socket and the charge cycle has not started or when the charge cycle is terminated. During charging, the detection current circuit is open, such that no detection current flows through the circuit.

One problem that may occur with this solution is that a battery may be discharged or drained if the charge connector is connected to the vehicle for a long time. One such situation may be if the driver e.g. goes on vacation and leaves the charge connector in the vehicle.

US 2012/0032634 discloses a proximity detection circuit suitable for use with an on-board vehicle charger, to facilitate current conservation during period of time when it is unnecessary for the on-board charger to test for connection of the on-board charger to a charging station. The shown solution may function for specific chargers. However, it comprises a large amount of components and is further not compatible with e.g. the CHAdeMo charger system.

There is thus a need for an improved and cost-effective circuit design for an electric vehicle charger system.

SUMMARY

An object of the disclosure is therefore to provide an improved circuit arrangement adapted to reduce the drain current of a vehicle charger system. A further object of the disclosure is to provide a method for reducing the drain current of a vehicle charger system.

The solution to the problem according to the disclosure is described in the circuit arrangement, vehicle and method described herein. Other advantageous developments of the inventive circuit arrangement and the vehicle are also described. A computer program and a computer program product for performing such a method are also described.

In a circuit arrangement for a vehicle charger system, adapted to reduce drain current in a connector proximity detection circuit when a charge connector is inserted in a charge socket and a charge cycle is terminated, the object of the disclosure is achieved in that the circuit arrangement comprises a resistor and a switch connected in parallel and arranged in the connector proximity detection circuit, where the switch is adapted to be opened when a charge cycle has started, and where the switch is adapted to remain open when the charge cycle has terminated and the charge connector remains in the charge socket.

By this first embodiment of a circuit arrangement according to the disclosure, a circuit arrangement which will reduce the drain current considerably is provided, and which still will allow the detection of a correctly inserted charge connector before a charge cycle is started.

The inventive circuit arrangement comprises a resistor and a switch connected in parallel. The circuit arrangement is arranged in series with the components of the connector proximity detection circuit, between the charger and a false-drive preventing circuit. When the switch of the circuit arrangement is closed, the connector proximity detection circuit will function as normal, such that a correctly inserted charge connector can be detected through the 10 mA detection current. By opening the switch of the circuit arrangement, the resistor of the circuit arrangement will reduce the current flowing through the connector proximity detection circuit to a much lower value, depending on the size of the resistor. This current is referred to as a drain current. A suitable value may e.g. be 100 kΩ, which will give a value of the drain current of around 0.1 mA. A drain current may be below 0.2 mA.

The switch of the circuit arrangement can be opened when a charge cycle has been terminated, i.e. when the charger is in a sleep mode, and the charge connector is still inserted in the charge socket. In such a case, there is no need for a detection current flowing through the connector proximity detection circuit. The detection current is important when the charge connector is inserted in the charge socket and the charge cycle has not started.

An opto-coupler is used in a current detection circuit to detect that a current flows through the connector proximity detection circuit, and will thus determine that the charge connector is still connected to the charge socket of the vehicle. When the current detection circuit does not detect any current at all, it will determine that the charge connector is removed from the charge socket of the vehicle. The switch of the circuit arrangement will now be closed such that the connector proximity detection circuit will function as normal, and such that a detection current flows through the connector proximity detection circuit.

In normal conditions, it is not a problem that the current flowing through the connector proximity detection circuit is 10 mA when a charge cycle is terminated. However, if the vehicle will stand for a few weeks or longer with the charge connector connected to the vehicle, the battery will lose some of its capacity. Combined with other electrical equipment of the vehicle, which also runs on low voltage, such as alarm, remote control receiver, timer, etc., it is important that the total idle current of the vehicle is not too high. This is also important since the low voltage battery of an electric vehicle is relatively small in comparison with a vehicle provided with a combustion engine, where the low voltage battery should be able to run e.g. the starter motor. In some vehicles, the low voltage is provided by a DC/DC-converter driven by the high voltage battery. It is of advantage to reduce the total idle current also in this case.

In a method for reducing the drain current in a connector proximity detection circuit of a vehicle charger system, the steps of connecting an additional resistor in series with the existing resistor in the connector proximity detection circuit in the vehicle by opening a switch connected in parallel with an additional resistor when a charge cycle has started, and keeping the switch open as long as the charge connector remains in the charge socket when the charge cycle is terminated, are comprised.

By this first embodiment of the method, the method will be able to reduce the drain current of a vehicle charger system when the charge connector remains in the charge socket, and when the charge cycle is terminated. This will reduce the idle current of the vehicle, which will allow the vehicle to stand for several weeks with the charge connector plugged in without affecting the capacity of the battery of the vehicle.

BRIEF DESCRIPTION OF THE DRAWINGS

The present disclosure will now be described in more detail, with reference to the appended drawings showing example embodiments, wherein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The embodiments of the disclosure with further developments described in the following are to be regarded only as examples and are in no way to limit the scope of the protection provided by the patent claims.

Figure 1:
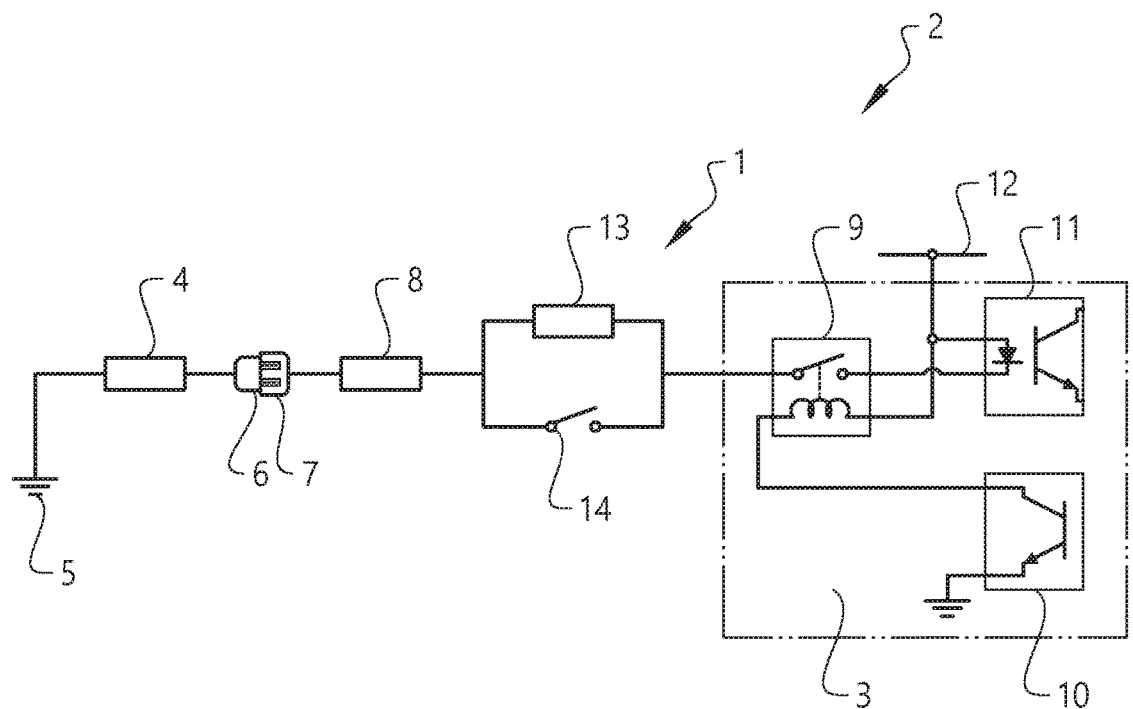
FIG. 1 shows a circuit arrangement according to the disclosure.

FIG. 1 shows a circuit arrangement according to the disclosure. The circuit arrangement 1 is comprised in a connector proximity detection circuit 2. The connector proximity detection circuit 2 also comprises a false-drive preventing circuit 3 adapted to detect a disconnected or broken ground connection of the charger system. The connector proximity detection circuit is connected to an external charger (not shown) which comprises a first resistor 4 which is arranged between the ground terminal 5 and the charge connector 6. The resistor 4 is typically a 200Ω resistor. The charge connector comprises a plurality of wires adapted for control signals, including CAN-bus wires, and two high current cables for the charge current. The charge connector 6 is connected to a charge socket 7 arranged on the vehicle.

The connector proximity detection circuit 2 comprises a second resistor 8, which is typically a 1000Ω resistor. The connector proximity detection circuit further comprises the circuit arrangement 1, which comprises a third resistor 13 and a second switch 14 connected in parallel. The second switch is adapted to bypass the third resistor such that the connector proximity detection circuit can be used to detect if a charge connector is connected to the charge socket before a charge cycle is started. The second switch may be a relay or a semiconductor switch, and is controlled by a drive circuit (not shown). The third resistor 13 has a relatively high resistance, e.g. in the range of 50-100 kΩ, such that a current flow below 0.2 mA can be achieved. When the second switch is open, the third resistor will be connected in series with the second resistor 8 and the first resistor 4.

The connector proximity detection circuit further comprises a false-drive preventing circuit 3 which comprises a first switch 9, which may be a relay and which is controlled by a drive circuit 10. The drive circuit is controlled to open the first switch 9 when the charger is charging, and to close the first switch when the charger is in a sleep mode, i.e. when the charger is not charging. The false-drive preventing circuit is connected to a low voltage terminal 12 having a voltage of 12 volt, supplied either from a low voltage battery of the vehicle or from a DC/DC-converter driven by the high voltage battery. When the first switch 9 is closed, and the second switch 14 is closed, a detection current will flow through the connector proximity detection circuit. The current will be detected by a current detection circuit 11 which comprises an opto-coupler. The current flows from the low voltage terminal 12 through a light emitting diode of the opto-coupler and through the resistors 8 and 4 to the ground terminal 5. The current will be approximately 10 mA and will be detected by the use of the opto-coupler. The first switch 9 is opened when the charger is charging the high voltage battery of the vehicle. When the charge cycle is terminated, and the charger is in a sleep mode, the first switch 9 will be closed again.

When the charge cycle has started, both the first switch 9 and the second switch 14 are opened. When the charge cycle is terminated, the first switch 9 is closed but the second switch 14 remains open. When the charger is the sleep mode, the current detection circuit will continue to detect that current flow through the connector proximity detection circuit. As long as a current is detected, the second switch 14 remains open in order to reduce the drain current. The drain current may be below 0.2 mA. When no current flow at all is detected, the system will determine that the charge connector is not inserted in the charge socket, since the connector proximity detection circuit is open. The second switch 14 will now be closed, such that resistor 13 is bypassed. The connector proximity detection circuit will now function as normal. The next time a charge connector is inserted in the charge socket, a detection current of 10 mA will flow through the connector proximity detection circuit.

Figure 2:
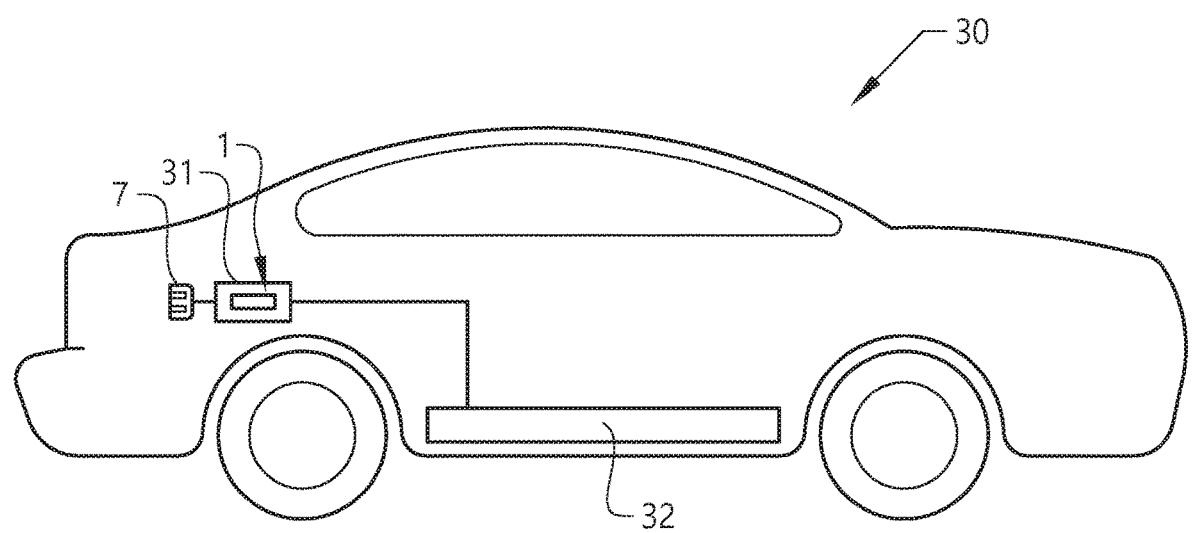
FIG. 2 shows a schematic vehicle comprising a circuit arrangement according to the disclosure.

FIG. 2 shows a vehicle 30 comprising an on-board charger circuit 31 provided with a circuit arrangement 1 according to the disclosure. The on-board charger circuit will charge a high voltage battery 32. The circuit arrangement is integrated in the on-board charging circuit 31 of the vehicle. The charge socket 7 may be positioned at the rear, where the fuel inlet normally is positioned, or at the front of the vehicle. The second switch 14 of the circuit arrangement is controlled by the charger control unit comprised in the on-board charger circuit system.

Figure 3:
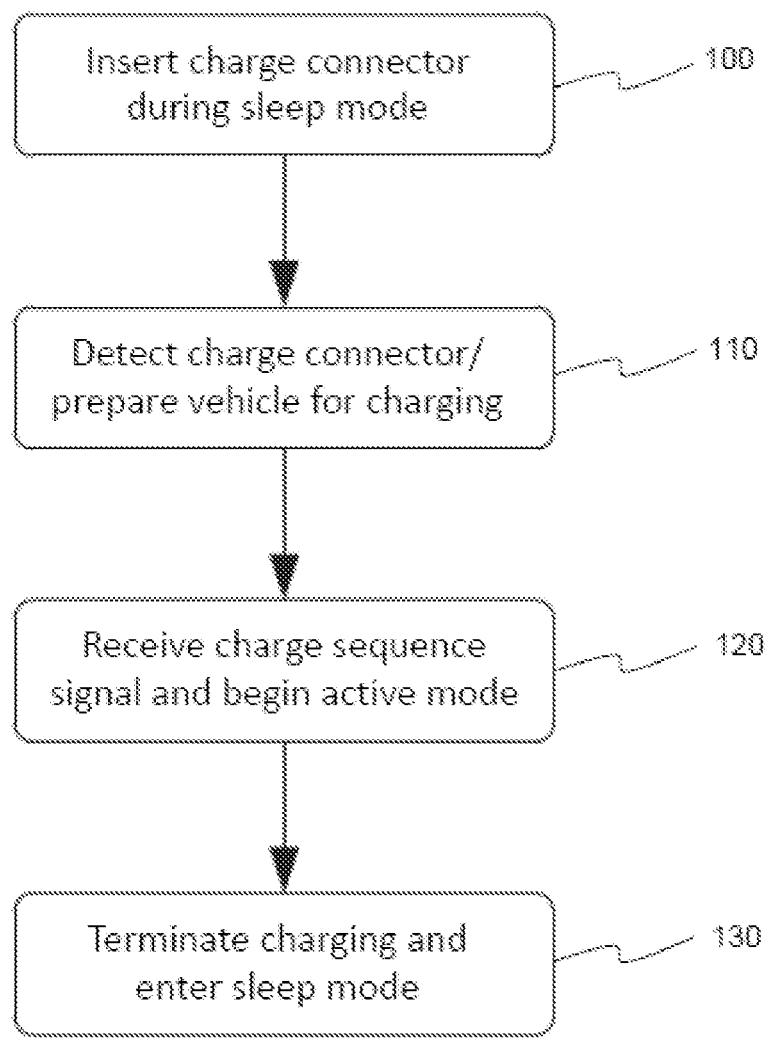
FIG. 3 shows a flow chart of an inventive method for reducing the detection current of a vehicle charging system.

FIG. 3 shows a schematic flow chart of the method for reducing the detection current in a proximity detection circuit of a vehicle charger system.

The method is performed when the high voltage battery of an electric vehicle is charged, and when the charging cycle has terminated and the charge connector is still connected to the vehicle. The method steps may be performed by a computer program and a computer program product contained and run in an electronic control unit of the vehicle.

In step 100, the charge cycle of the vehicle starts. The charger is in a sleep mode and the charge connector is inserted into the charge socket 7 of the vehicle. The first switch 9 of the connector proximity detection circuit and the second switch 14 of the circuit arrangement 1 are both closed.

In step 110, the charging circuit determines that the charge connector is inserted by detecting that a detection current flows through the connector proximity detection circuit. The detection current should in this case be above a predefined threshold level in order to be recognized as a detection current and to conform to the CHAdeMO-specifications. The detection current is thus in this example 10 mA. The current flow is detected by a current detection circuit. The charger circuit further determines that the ground connection is correct, and that the vehicle is prepared for charging. When all controls are correct, the charge cycle can start by sending one or more charge sequence signals from the charger to the vehicle.

In step 120, the charger circuit receives a charge sequence signal and the power lines from the power source of the charger are connected to the battery by closing contactors in the power lines. The charging of the high voltage battery of the vehicle starts, and the charger is an active mode. The first switch 9 and the second switch 14 are both opened by the charger circuit. By opening the second switch, the third resistor is connected in series with the existing resistor in the proximity detection circuit.

In step 130, the charging of the battery of the vehicle is finished. The charging terminates and the charger is in a sleep mode. The first switch 9 is closed, but the second switch 14 remains open. In this way, the current flow through the connector proximity detection circuit will be relatively low, which reduces the idle current of the vehicle. The current flow is detected by the current detection circuit. When the current detection circuit does not detect any current flow, the second switch will be closed, since it is determined that the charge connector has been removed from the charge socket.

It noted that any circuit, unit, control unit, controller, algorithm, device, feature, system, functionality, module, arrangement, or the like described herein may comprise and/or be implemented in or by one or more appropriately programmed processors (e.g., one or more microprocessors including central processing units (CPU)) and associated memory and/or storage, which may include data, microcode, firmware, operating system software, application software and/or any other suitable program, code or instructions executable by the processor(s) for controlling operation thereof, for controlling the various features and/or components described herein, for providing and/or controlling interaction and/or cooperation between the various features and/or components described herein, and/or for performing the particular algorithms represented by the various functions and/or operations described herein.

The disclosure is not to be regarded as being limited to the embodiments described above, a number of additional variants and modifications being possible within the scope of the subsequent patent claims.

REFERENCE SIGNS

1: Circuit arrangement
2: Connector proximity detection circuit
3: False-drive preventing circuit
4: First resistor
5: Ground terminal
6: Charge connector
7: Charge socket
8: Second resistor
9: First switch
10: Drive circuit
11: Current detection circuit
12: Low voltage terminal
13: Third resistor
14: Second switch
30: Vehicle
31: On-board charger circuit
32: High voltage battery While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A circuit arrangement, for an on-board vehicle charger system, configured to reduce a drain current in a connector proximity detection circuit when a charge connector is inserted in a charge socket and a charge cycle is terminated, the circuit arrangement comprising:

a resistor; and a switch, wherein the resistor and the switch are connectable in parallel and arrangeable in the connector proximity detection circuit, the resistor and the switch being integrated in the on-board vehicle charger system within a vehicle, the resistor and switch being connected between a false-drive preventing circuit of the connector proximity detection circuit and the charge socket;

wherein the switch is configured to be opened when a charge cycle has started, and wherein the switch is configured to remain open when the charge cycle has terminated and the charge connector remains in the charge socket;

wherein the false-drive preventing circuit further comprises:

a second switch, and a drive circuit configured to open the second switch when the charge cycle has started, and to close the second switch when the charge cycle has terminated.

2. The circuit arrangement according to claim 1 wherein the resistor is larger than 50 kΩ.

3. The circuit arrangement according to claim 1 wherein the circuit arrangement is configured to be used in a CHAdeMO charging system.

4. The circuit arrangement according to claim 1 wherein a detection current is detected by a current detection circuit.

5. The circuit arrangement according to claim 1 wherein the switch is configured to be closed when the charge connector is removed from the charge socket.

6. The circuit arrangement according to claim 5 wherein the switch is configured to be closed when a current detection circuit does not detect current flow.

7. The circuit arrangement according to claim 1 wherein the switch comprises a first switch, and wherein the false-drive preventing circuit further comprises:

a current detection circuit coupled to a low voltage source and configured to measure current flow from the low voltage source when the first switch and the second switch are closed.

8. The circuit arrangement according to claim 7 wherein the current detection circuit comprises an opto-coupler.

9. A vehicle comprising the circuit arrangement according to claim 1.

10. A method for reducing drain current in a connector proximity detection circuit for an on-board vehicle charger system, the method comprising:

connecting an additional resistor, in a vehicle, in series with an existing resistor in the connector proximity detection circuit in the vehicle by opening a switch, in the vehicle, connected in parallel with the additional resistor when a charge cycle has started, wherein the additional resistor and the switch form a circuit arrangement integrated in the on-board vehicle charger system within the vehicle, wherein the circuit arrangement is connected between a false-drive preventing circuit of the connector proximity detection circuit and a charge socket for receiving a charge connector, wherein the false-drive preventing circuit comprises a second switch;

after opening the switch when the charge cycle started, keeping the switch open as long as the charge connector remains in the charge socket when the charge cycle is terminated;

opening the second switch when the charge cycle has started; and closing the second switch when the charge cycle has terminated.

11. The method according to claim 10 further comprising closing the switch when a current detection circuit does not detect a current flow.

12. The method of claim 10, wherein the switch comprises a first switch, and wherein the false-drive preventing circuit further comprises a current detection circuit coupled to a low voltage source, the method further comprising:

measuring current flow from the low voltage source when the first switch and the second switch are closed.

13. A non-transitory computer readable medium having stored computer executable instructions for reducing a drain current in a connector proximity detection circuit for an on-board vehicle charger system, the instructions for execution by a processor and memory to:

connect an additional resistor, in a vehicle, in series with an existing resistor in the connector proximity detection circuit in the vehicle by opening a switch, in the vehicle, connected in parallel with the additional resistor when a charge cycle has started, the additional resistor and the switch forming a circuit arrangement integrated in the on-board vehicle charger system within the vehicle, wherein the circuit arrangement is connected between a false-drive preventing circuit of the connector proximity detection circuit and a charge socket for receiving a charge connector, wherein the false-drive preventing circuit comprises a second switch;

after opening the switch when the charge cycle started, keep the switch open as long as the charge connector remains in the charge socket when the charge cycle is terminated;

open the second switch when the charge cycle has started; and close the second switch when the charge cycle has terminated.

14. The non-transitory computer readable medium of claim 13 further comprising computer executable instructions for execution by the processor and memory to close the switch when a current detection circuit does not detect a current flow.

15. The non-transitory computer readable medium of claim 13, wherein the switch comprises a first switch, and wherein the false-drive preventing circuit further comprises a current detection circuit coupled to a low voltage source, the non-transitory computer readable medium further comprising computer executable instructions for execution by the processor and memory to:

measure current flow from the low voltage source when the first switch and the second switch are closed.

* * * * *